No. 668,284. Patented Feb. 19, 1901.
L. W. COLLINS.
SEPARATOR FOR BATTERIES.
(Application filed Feb. 9, 1900.)

(No Model.)

Witnesses:
Ray White.
Harry B. L. White.

Inventor:
Leslie W. Collins.
By Foreé Bain Attorney.

UNITED STATES PATENT OFFICE.

LESLIE W. COLLINS, OF CHICAGO, ILLINOIS, ASSIGNOR TO THE COLLINS STORAGE BATTERY COMPANY, OF SAME PLACE.

SEPARATOR FOR BATTERIES.

SPECIFICATION forming part of Letters Patent No. 668,284, dated February 19, 1901.

Original application filed July 7, 1899, Serial No. 723,121. Divided and this application filed February 9, 1900. Serial No. 4,538. (No model.)

*To all whom it may concern:*

Be it known that I, LESLIE W. COLLINS, a citizen of the United States, residing in Chicago, county of Cook, and State of Illinois, have invented certain new and useful Improvements in Separators for Batteries; and I do hereby declare the following to be a full, clear, and exact description of the invention, such as will enable persons skilled in the art to which it appertains to make and use the same.

My invention relates to improvements in separators for the elements comprising a storage battery, (a divided application from the original filed July 7, 1899, Serial No. 723,121.)

The object of my invention is to provide an insulator for separating the adjacent plates or electrodes in a storage battery that will be strong, durable, and which will cover as small an area of the active surfaces of the electrodes as possible consistent with the very desirable qualities referred to.

When a large surface of the plate is covered by the separator, the part so covered becomes inactive for the purpose intended, and besides the inactive surface has a great affinity for the evolved gases which accumulate around the edges of the plate near the separator, and by this means a larger area of the plate is shielded from the active effect of the electrolyte by being covered by the gases in the manner described in addition to the surface covered by the actual contact of the separator with the plate. My separator is constructed of material that is as near a perfect electric insulator as possible and is formed up in such manner as to resist the greater strains or pressure to which it may be subjected to present the slightest surface contacts with the plate and at the same time to permit, in virtue of its peculiar construction, free circulation of the electrolyte and the ready escape of the gases evolved at the surfaces of the electrodes.

The arch-shaped section of the bars comprising my separator presents the best form of construction for resisting pressure or strain between the electrodes due to their tendency to "buckle" or curve up, whereby they would, if not resisted by the separator, make contact one with the other, and thereby produce a "short circuit," the effect of which would destroy the cell.

Figure 1:
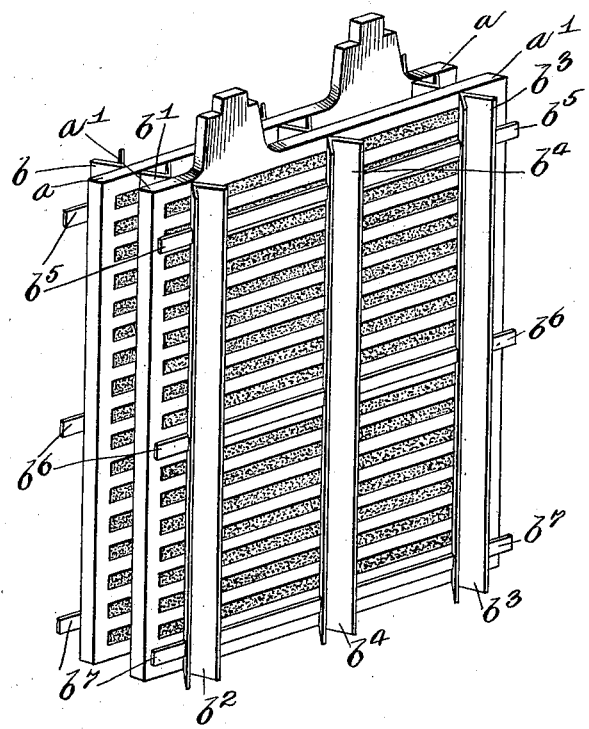
Figure 2:
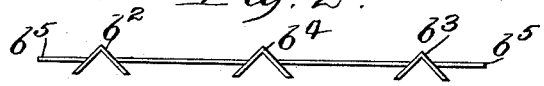

The drawings show several assembled plates with my separator in place between the plates, Figure 1. Fig. 2 is a view of my separator from above.

In the drawings the same reference-letters refer to similar parts in both figures.

In Fig. 1, $a$ and $a'$ are two ordinary plates forming elements of the same battery-cell. The separators $b$ $b'$ $b^2$ are in position. $b'$ is between plates $a$ and $a'$. $b^2$ is in position against the side of plate $a'$, ready for another plate to be added to the pile. The three angle-shaped separating-bars $b^2$ $b^3$ $b^4$ compose the major portion of my separator. The longitudinal strips $b^5$, $b^6$, and $b^7$ are glued, cemented, or otherwise attached to the vertical bars and used to retain the said bars in their respective vertical positions. The strips $b^5$ join the angle-bars at a point between the base and the apex of the arch formed by the said bars, as shown, so that the strips $b^5$ will not come into contact with the surface of the active elements of the battery.

My separator may be made of such material as hard sheet-rubber, celluloid, or the like, and the strips $b^5$ may be joined to the arch-shaped angle-pieces $b^2$ $b^3$ $b^4$ by vulcanizing them together, by cementing them, or by any means whereby a strong and durable joint may be made.

Having described my invention, what I claim as new, and desire to secure by Letters Patent of the United States, is—

In a battery and insulating-separator for the active elements thereof, consisting of a series of separate bars having a V-shaped cross-section, the edges of the sides of the angle in contact with one element, the point where the two sides meet in contact with the opposite element, and narrow strips connected to the said bars, between the base and apex of the said angle, substantially as set forth.

In testimony whereof I have signed this specification, in the presence of two subscribing witnesses, this 29th day of January, 1900.

LESLIE W. COLLINS.

Witnesses:
FORÉE BAIN,
M. F. ALLEN.